United States Patent
Hansen et al.

(10) Patent No.: US 12,239,143 B2
(45) Date of Patent: Mar. 4, 2025

(54) CENTER-FILLED CONFECTIONERY PRODUCT; COATED PRODUCT; AND METHODS OF MAKING

(71) Applicant: INTERCONTINENTAL GREAT BRANDS LLC, East Hanover, NJ (US)

(72) Inventors: Joern Holm Hansen, Munich (DE); Anna Wasylewicz, Bielany Wroclawskie (PL); Maxi Zier, Munich (DE); Alexis Detavernier, Zurich (CH)

(73) Assignee: INTERCONTINENTAL GREAT BRANDS LLC, East Hanover, NJ (US)

( * ) Notice: Subject to any disclaimer, the term of this patent is extended or adjusted under 35 U.S.C. 154(b) by 938 days.

(21) Appl. No.: 17/286,960

(22) PCT Filed: Oct. 17, 2019

(86) PCT No.: PCT/US2019/056732
§ 371 (c)(1),
(2) Date: Apr. 20, 2021

(87) PCT Pub. No.: WO2020/086377
PCT Pub. Date: Apr. 30, 2020

(65) Prior Publication Data
US 2021/0244044 A1    Aug. 12, 2021

Related U.S. Application Data

(60) Provisional application No. 62/751,141, filed on Oct. 26, 2018.

(51) Int. Cl.
*A23G 3/54* (2006.01)
*A23G 3/36* (2006.01)
*A23G 3/42* (2006.01)

(52) U.S. Cl.
CPC .............. *A23G 3/54* (2013.01); *A23G 3/362* (2013.01); *A23G 3/42* (2013.01)

(58) Field of Classification Search
None
See application file for complete search history.

(56) References Cited

U.S. PATENT DOCUMENTS

| | | |
|---|---|---|
| 4,032,661 A | 6/1977 | Roswell et al. |
| 4,136,163 A | 1/1979 | Watson et al. |
| 4,178,459 A | 12/1979 | Watson et al. |
| 4,230,688 A | 10/1980 | Roswell et al. |
| 4,275,083 A | 6/1981 | Colten et al. |
| 4,296,255 A | 10/1981 | Roswell et al. |
| 4,459,425 A | 7/1984 | Amano et al. |
| 4,619,834 A | 10/1986 | Zanno et al. |
| 5,009,893 A | 4/1991 | Cherukuri et al. |
| 5,266,592 A | 11/1993 | Grub et al. |
| 5,698,181 A | 12/1997 | Luo |
| 6,277,385 B1 | 8/2001 | Luke |
| 6,592,884 B2 | 7/2003 | Hofmann et al. |
| 6,627,233 B1 | 9/2003 | Wolf et al. |
| 7,030,273 B1 | 4/2006 | Sun |
| 7,189,760 B2 | 3/2007 | Erman et al. |
| 2003/0059501 A1 | 3/2003 | River |
| 2005/0222256 A1 | 10/2005 | Erman et al. |
| 2005/0265930 A1 | 12/2005 | Erman et al. |
| 2008/0248089 A1 | 10/2008 | Bugge et al. |
| 2010/0166914 A1 | 7/2010 | Herron et al. |

FOREIGN PATENT DOCUMENTS

| | | |
|---|---|---|
| EP | 1151673 A2 | 11/2001 |
| WO | 2004064544 A1 | 8/2004 |
| WO | 2005074701 A1 | 8/2005 |
| WO | 2006125334 A1 | 11/2006 |
| WO | 2006127599 A2 | 11/2006 |
| WO | 2008152626 A2 | 12/2008 |
| WO | 2011153223 A2 | 12/2011 |
| WO | 2011153229 A1 | 12/2011 |
| WO | 2016166092 A1 | 10/2016 |

OTHER PUBLICATIONS

Hintlian, F., "Filled Hard Candy" The Manufacturing Confectioner, Chicago, IL, (Oct. 1995, pp. 61-65) ISSN: 0163-4364.
International Search Report mailed Jan. 20, 2020; International Application No. PCT/US2019/056732; International Filing Date Oct. 17, 2019 (8 pgs).
Written Opinion mailed Jan. 20, 2020; International Application No. PCT/US2019/056732; International Filing Date Oct. 17, 2019 (7 pgs).

*Primary Examiner* — Jyoti Chawla
(74) *Attorney, Agent, or Firm* — CANTOR COLBURN LLP

(57) ABSTRACT

Disclosed are coated center-filled hard confectionery products exhibiting enhanced flavor release profiles and a multisensorial effect. The center-filled hard confectionery product comprises a center-fill region comprising an effervescent composition, at least one hard confectionery shell region comprising a hard boiled candy, at least a coating region, wherein the hard confectionery shell region, and optionally the center-fill region, the coating region, or a combination thereof, comprises at least one flavorant.

20 Claims, 4 Drawing Sheets

# CENTER-FILLED CONFECTIONERY PRODUCT; COATED PRODUCT; AND METHODS OF MAKING

CROSS REFERENCE TO RELATED APPLICATIONS

This application is a National Stage application of PCT/US2019/056732, filed on Oct. 17, 2019, which claims priority to U.S. Provisional Application No. 62/751,141, filed on Oct. 26, 2018, the disclosures of which are incorporated herein by reference in their entirety.

FIELD

This disclosure generally relates to optionally coated, center-filled confectionery having multiple phases, multiple components, and multiple textures; and methods of making thereof.

BACKGROUND

Hard boiled candies are known hard, solid confectionery in an essentially amorphous or "glassy" form containing a low moisture content. Sugar-based hard boiled candies are made by boiling a mixture of sugar, glucose syrup and water to moisture content of around three percent. Sugar-free hard boiled candies can be prepared by boiling a mixture of a sugar polyol and water, optionally with a sugar polyol syrup.

There remains a need in the art to provide hard boiled candies having unique flavor release profiles, multiple flavors, multiple textures, and additional attributes not achieved by conventional hard boiled candy.

BRIEF DESCRIPTION OF THE DRAWINGS

Referring now to the figures, which are exemplary embodiments, and wherein the like elements are numbered alike.

SUMMARY

Figure 1:
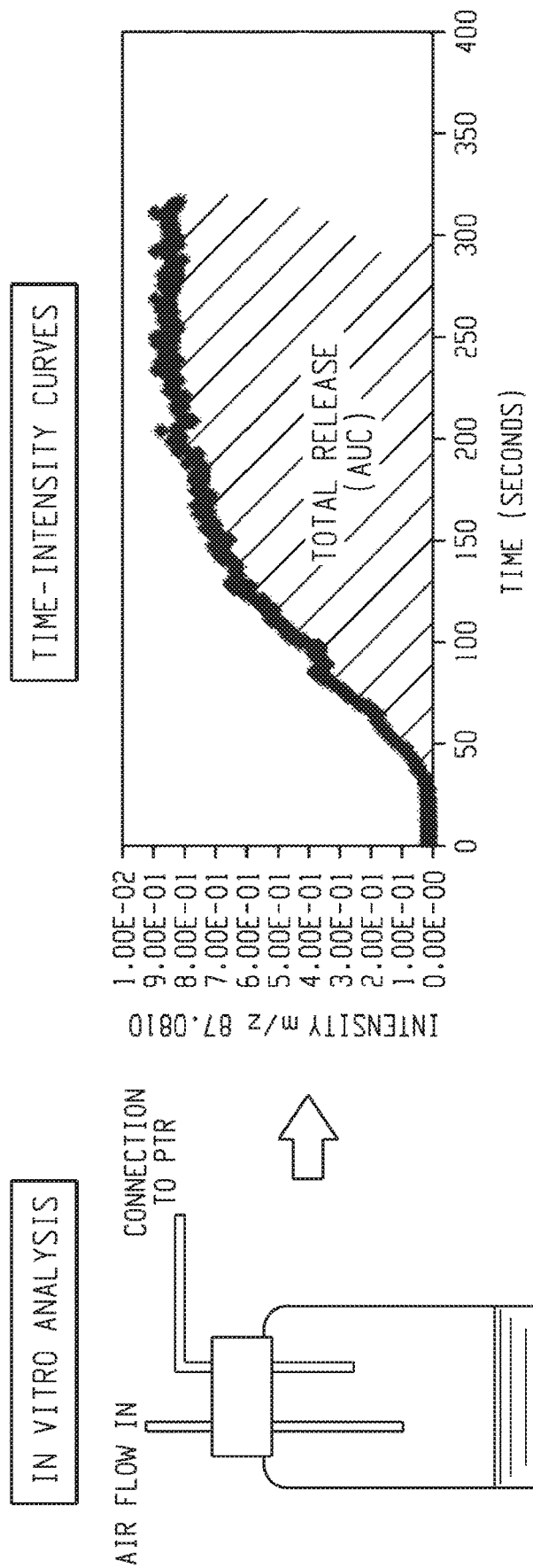
FIG. 1 illustrates the in vitro PTR-MS analysis set-up and an example time-intensity curves (time in seconds versus intensity m/z of a flavor compound).

In one embodiment, a center-filled hard confectionery product comprises a center-fill region comprising at least one effervescent composition; at least one hard confectionery shell region comprising a hard boiled candy; at least one coating region comprising a soft panned coating; and wherein the hard confectionery shell region, and optionally the center-fill region, the coating region, or a combination thereof, comprises at least one flavorant.

In another embodiment, a center-filled hard confectionery product comprises a center-fill region comprising at least one effervescent composition; at least one hard confectionery shell region comprising a hard boiled candy; at least one coating region excluding a hardboiled candy; wherein the hard confectionery shell region, and optionally the center-fill region, the coating region, or a combination thereof, comprises at least one flavorant; wherein at least the shell region flavorant or the coating region flavorant exhibits increased flavor release upon exposure of the center-fill region to a solvent; and wherein the flavor release is at least 225% greater than the baseline before center-fill region exposure.

In another embodiment, a method of preparing a center-filled hard confectionery product comprises extruding a center-filled rope of a hard confectionery composition melt, wherein the rope includes a center-fill composition; sizing the center-filled rope; feeding the sized center-filled rope into a forming mechanism; forming individual pieces of the sized center-filled rope; and coating at least a portion of the surface of the individual pieces to form a coated center-filled hard confectionery product comprising a center-fill region comprising at least one effervescent composition or at least one powder or particulate composition; at least one hard confectionery shell region comprising a hard boiled candy; at least one coating region excluding a hardboiled candy, specifically comprising a soft panned coating; and wherein the hard confectionery shell region, and optionally the center-fill region, the coating region, or a combination thereof, comprises at least one flavorant. Within this embodiment, at least the shell region flavorant or the coating region flavorant exhibits increased flavor release upon exposure of the center-fill region to a solvent, and wherein the flavor release is at least 225% greater than the baseline before center-fill region exposure; or within this embodiment, wherein at least the shell region flavorant or the coating region flavorant exhibits increased flavor release upon exposure of the center-fill region to a solvent, and wherein the flavor release rate ratio before and after center-fill exposure increases by at least 150% due to the center-fill composition for a flavorant contained in the coating region or hard confectionery shell region.

The above described and other features are exemplified by the following figures and detailed description.

DETAILED DESCRIPTION

Disclosed herein are water soluble, optionally coated, center-filled hard confectionery products comprising a center-fill region comprising at least one effervescent composition, at least one hard confectionery shell region comprising a hard boiled candy, and optionally at least one coating region, which is not a hard boiled candy. Any one of the center-fill region, the hard confectionery shell region, the coating region, or a combination thereof comprises a flavorant. The multi-layered product with an effervescent composition in the center-fill region is designed to deliver novel multisensorial experiences to the consumer. The product can deliver three or more distinct multisensorial experiences, including flavor, texture, and/or color changes in a single confectionery format which is designed to be dissolved in the mount of the consumer versus being chewed. Further advantages of the hard confectionery product over known confectionery include:

the center-fill region comprising the effervescent composition is shown to increases flavor release rates of flavor compounds in surrounding regions of the product;

there are contrasting textures and appearances between the regions of the single product (e.g., a rough coating region and particulate or powder effervescent composition in the center-fill region each provide contrasting textures and appearance to the glassy matrix of the hard boiled candy of the shell region thereby providing a sequence of contrasting textures and appearances;

use of an opaque coating can hide the particulate or powder center-fill region versus an uncoated translucent hard boiled candy shell region;

the at least three regions can be used as a delivery vehicle for a sequential flavor release of flavors from each region providing a unique flavor experience;

unlike a coated powder-filled chewing gum or coated powder-filled soft candy which are soft and therefore chewed, the hard confectionery shell region provides a glassy hard barrier to "chewing" and enforces slow dissolving in the consumer's mouth;

where each of the above facilitates an extended sequence of multiple flavor, color, and texture transitions upon consuming a single product.

In an embodiment, the center-fill region comprises a powder or particulate effervescent composition.

In an embodiment, the hard confectionery shell region completely surrounds the center-fill region.

In an embodiment, the coating region partially or completely surrounds the hard confectionery shell region.

As used herein, the term "hard confectionery composition" means an edible hard boiled candy, also referred to as amorphous hard candy or glassy matrix that is water soluble and meant to be consumed by dissolving slowly in the mouth. Hard-boiled candies, also known as hard sweets or boiled sweets, are solids and essentially amorphous confectionery products obtained by extensive dehydration of carbohydrate or sugar polyol syrups. Hard-boiled candies can be sugar based or sugar free. The hard confectionery composition excludes chewing gum and does not contain insoluble, polymeric or elastomeric chewing gum components such as gum base or chewing gum elastomers. The hard confectionery composition also excludes chewy confectionery such as low boiled sweets, toffees, caramel, taffy, nougat, jellies, and gummies. The hard confectionery composition can be used as the shell component of a center-fill hard confectionery product. The center-fill hard confectionery product may optionally be coated, e.g. with a soft coating, hard coating, or sanded coating.

In an embodiment, the coating region is not a hardboiled candy or glassy matrix.

In an embodiment, the hard confectionery composition is the shell component of a coated, center-fill hard confectionery product.

The hard confectionery composition shell region is present in the hard confectionery product in an amount of about 70 weight percent (wt %) to about 98 wt % based on the total weight of the coated, center-filled hard confectionery product, specifically about 79 wt % to about 95 wt %, and more specifically about 88 wt % to about 92 wt %.

In general, a hard confectionery composition used for the shell region has a base composed of a mixture of a saccharide or sugar polyol, and has an amorphous or glassy form. This form is considered a solid syrup of sugars or sugar alcohols generally having a low amount of moisture. The hard confectionery composition used as a shell component in the hard confectionery product can be sugar-based or sugar-free. The hard confectionery composition can comprise a saccharide, a sugar polyol, or a combination thereof, and optional additional ingredients. The saccharide and sugar polyol can be in dry form or in syrup/solution form prior to cooking, or a blend of dry and syrup/solution forms. The hard candy shell region can completely surround a center-fill composition region.

The saccharide can include a mono-saccharide, di-saccharide and polysaccharide such as sucrose (sugar), dextrose, maltose, dextrin, xylose, ribose, glucose, mannose, galactose, fructose (levulose), lactose, invert sugar, fructo oligo saccharide, partially hydrolyzed starch, isomaltulose, high fructose corn syrup, a polydextrose, allulose, honey, arabinose, kestose, isomalto-oligosaccharides, gentio-oligosaccharides, cellodextrins, raffinose, maltodextrin, beta-glucans, oligodextran, or a combination thereof.

The sugar polyol (alternatively referred to as a "sugar alcohol") can be erythritol, galactitol, hydrogenated starch hydrolysate, isomalt, lactitol, maltitol, mannitol, polyglycitol, polyglucitol, sorbitol, tagatose, xylitol, or a combination thereof, wherein the sugar polyol can be in the form of a syrup. In an embodiment, the sugar polyol is maltitol, sorbitol, xylitol, or a combination thereof. In an embodiment, the sugar polyol of the hard confectionery composition comprises isomalt, xylitol, noncrystallizing sorbitol syrup, maltitol syrup, or a combination thereof.

In an embodiment, the sugar polyol can be isomalt, a disaccharide alcohol. Isomalt can be prepared by hydrogenating isomaltulose. Products of the hydrogenation can include 6-O-α-D-glucopyranosyl-D-sorbitol (1,6-GPS); 1-O-α-D-glucopyranosyl-D-sorbitol (1,1-GPS); 1-O-α-D-glucopyranosyl-D-mannitol (1,1-GPM); 6-O-α-D-glucopyranosyl-D-mannitol (1,6-GPM); and mixtures thereof. Some commercially available isomalt materials include an almost equimolar mixture of 1,6-GPS, and 1,1-GPM. Other isomalt materials can include pure 1,6-GPS; 1,1-GPS; 1,6-GP; and 1,1-GPM. Still other isomalt materials can include mixtures of 1,6-GPS; 1,1-GPS; 1,6-GPM; and 1,1-GPM at any ratio.

In an embodiment, the sugar polyol has a negative enthalpy of dissolution (aka negative heat of solution) such as xylitol and erythritol. The sugar polyol may have a negative heat of solution of between −20 Kcal/kg to −50 Kcal/kg.

The hard confectionery composition can comprise the saccharide or sugar polyol in an amount of about 90 to about 100 wt. % based on the total weight of the hard confectionery composition, specifically about 92 to about 99 wt. %, and yet more specifically about 96 to about 99 wt. %.

The hard confectionery composition can further comprise an optional additional ingredient such as a flavorant, a food acid or salt thereof, a sensate, a high intensity sweetener, a colorant, a functional ingredient, a humectant, a buffering agent, a medicament, an antioxidant, a preservative, a processing aid, or a combination thereof.

The amount and type of flavorant used in the hard confectionery composition can be chosen based on the targeted release profile and flavor intensity desired. The flavorant can be present in the hard confectionery composition in an amount of about 0.001 to about 6 wt. % based on the total weight of the hard confectionery composition, specifically about 0.01 to about 3 wt. %, and yet more specifically about 0.1 to about 0.6 wt. %.

The sensate, specifically a cooling agent, can be present in the hard confectionery composition in an amount of about 0.001 to about 2 wt. % based on the total weight of the hard confectionery composition, specifically about 0.01 to about 1 wt. %, and yet more specifically about 0.1 to about 0.5 wt. %.

The high intensity sweetener can be present in the hard confectionery composition in an amount of about 0.001 to about 2 wt. % based on the total weight of the hard confectionery composition, specifically about 0.01 to about 0.7 wt. %, and yet more specifically about 0.1 to about 0.5 wt. %.

The optional food acid can be present in the hard confectionery composition in an amount of about 0.001 to about 3 wt. % based on the total weight of the hard confectionery composition, specifically about 0.01 to about 1.5 wt. %, and yet more specifically about 0.1 to about 0.8 wt. %.

The moisture content of the hard confectionery composition region can be about 0 to about 5 wt. % based on the total weight of the hard confectionery composition region, specifically about 0.5 to about 4 wt. %, and yet more specifically about 1 to about 3 wt. %.

The processing aid of the hard confectionery composition region can be a wax (e.g. carnauba wax, parrifin wax, bees wax, and the like), a fat or oil (e.g. medium chain triglyderide), a modified cellulose (e.g. carboxymethyl cellulose), a combination thereof, and the like.

Center-Fill Region

The center-fill region of the hard confectionery product can be a solid or semi-solid material, specifically a powder or particulate center-fill material.

The center-fill region is present in the hard confectionery product in an amount of about 2 wt % to about 25 wt % based on the total weight of the coated, center-fill hard confectionery product, specifically about 3 wt % to about 17 wt %, and more specifically about 4 wt % to about 6 wt %.

The center-fill region can comprise a bulk sweetener (e.g. saccharide or sugar polyol as described herein), an effervescent composition, and an additional ingredient such as a flavorant, a food acid or salt thereof, a sensate, a high intensity sweetener, a colorant, a functional ingredient, a humectant, a buffering agent, a medicament, an antioxidant, a preservative, a processing aid, a plant or fruit (e.g. in the form of a powder, particles, or dehydrates), or a combination thereof. In an embodiment, the sugar polyol bulk sweetener has a negative enthalpy of dissolution such as xylitol and erythritol.

The center-fill region can comprise the bulk sweetener in an amount of about 65 wt % to about 95 wt % based on the total weight of the center-fill region, specifically about 68 wt % to about 91 wt %, and more specifically about 71 wt % to about 88 wt %. In an embodiment the bulk sweetener is a saccharide. In another embodiment, the bulk sweetener is isomalt, xylitol, or a combination thereof.

The effervescent composition generally comprises a food acid and a basic ingredient, which react upon contact with moisture (e.g. saliva in the consumer's mouth) to generate effervescence.

The basic ingredient can be an alkali metal, alkaline earth metal, or Group 8 metal carbonate, an alkali metal, alkaline earth metal, or Group 8 metal bicarbonate, or a combination thereof. Examples include a sodium, potassium, calcium, magnesium, or ferrous carbonate or bicarbonate, or a combination thereof. In an embodiment, the basic ingredient is sodium hydrogen carbonate. The food acid can be adipic acid, ascorbic acid, butyric acid, citric acid, formic acid, fumaric acid, glyconic acid, lactic acid, phosphoric acid, malic acid, oxalic acid, succinic acid, tartaric acid or a combination thereof. In an embodiment, the food acid is citric, lactic, or a combination thereof.

In an embodiment, an ingredient of the effervescent composition may be encapsulated. Encapsulation may be desirable because it lends further moisture-resistance to the components, thereby preventing premature reaction of the acid and basic components. The acid and basic ingredient may be encapsulated as microcapsules or microparticles as described in PCT Publication No. WO 2004/064544, which is incorporated herein by reference in its entirety. Exemplary suitable encapsulants include fats, polymers, carbohydrates, a hydrocolloid (e.g. gum arabic), or a combination thereof.

The effervescent composition used on the center-fill region may release carbon dioxide during effervescence. It has been discovered that the optionally coated center-filled hard confectionery product comprising the effervescent composition in the center-fill region assists the release of the flavorant of the remaining product regions, including the shell region surrounding the center-fill region and/or the coating region surrounding the shell region to provide enhanced flavor release of the flavorants in the shell or coating.

The center-fill region can comprise the effervescent composition in an amount of about 0.2 wt % to about 35 wt % based on the total weight of the center-fill region, specifically about 4 wt % to about 27 wt %, and more specifically about 8 wt % to about 20 wt %. The food acid of the effervescent composition can be present in an amount of about 0.1 wt % to about 15 wt % based on the total weight of the center-fill region, specifically about 0.4 wt % to about 12 wt %, and more specifically about 0.8 wt % to about 8 wt %. The basic ingredient of the effervescent composition can be present in an amount of about 0.1 wt % to about 20 wt % based on the total weight of the center-fill region, specifically about 4 wt % to about 15 wt %, and more specifically about 8 wt % to about 11 wt %

The center-fill region can comprise the flavorant in an amount of about 0.1 wt % to about 5 wt % based on the total weight of the center-fill region, specifically about 0.5 wt % to about 4 wt %, and more specifically about 1 wt % to about 3 wt %.

The moisture content of the center-fill region can be about 0 to about 7 wt. % based on the total weight of the center-fill region, specifically about 0.5 to about 6 wt. %, and yet more specifically about 1 to about 5 wt. %.

The processing aid of the center-fill region can be a wax (e.g. carnauba wax, parrifin wax, bees wax, and the like), a fat or oil (e.g. medium chain triglyderide), a modified cellulose (e.g. carboxymethyl cellulose), a combination thereof, and the like.

A method for enhancing the flavor of a hard confectionery product comprises using an effervescent center-fill, thereby enhancing the flavor release of the flavors located in the hard confectionery shell and, if present, the flavors located in the coating.

Coating Region

The coating region of the hard confectionery product may be a soft coating, a hard coating, or a sanded surface. In an embodiment, the coating is a soft coating. The coating region may partially to fully surround the hard confectionery shell region.

The coating region is present in the hard confectionery product in an amount of about 1 wt % to about 20 wt % based on the total weight of the coated center-filled hard confectionery product, specifically about 2 wt % to about 13 wt %, and more specifically about 4 wt % to about 6 wt %.

The coating composition generally comprises a saccharide or sugar polyol, a binding agent and an optional additional ingredient such as a flavorant, a food acid or salt thereof, a sensate, a high intensity sweetener, a colorant, a functional ingredient, a buffering agent, a medicament, an antioxidant, a preservative, a processing aid, or a combination thereof. The coating region can further comprise a glaze or polishing agent such as carnauba wax, bees wax, and the like.

The coating composition can comprise a saccharide or sugar polyol in an amount of about 70 wt % to about 99 wt % based on the total weight of the coating composition, specifically about 75 wt % to about 95 wt %, and more specifically about 79 wt % to about 90 wt %. In an embodiment, the sugar polyol of the coating composition is isomalt, xylitol, or a combination thereof. In an embodiment, the sugar polyol has a negative enthalpy of dissolution such as xylitol and erythritol.

The coating binding agent can be a hydrocolloid or plant gum, such as gum arabic. The coating composition can comprise the binding agent in an amount of about 1 wt % to about 15 wt % based on the total weight of the coating composition, specifically about 3 wt % to about 12 wt %, and more specifically about 7 wt % to about 9 wt %.

The moisture content of the coating composition region can be about 0 to about 7 wt. % based on the total weight of the hard confectionery composition region, specifically about 0 to about 5 wt. %, and yet more specifically about 0 to about 3 wt. %.

Confectionery Product Ingredients: Flavorant

Each region (e.g. the hard confectionery shell, center-fill, coating, additional regions, or a combination thereof) can comprise a flavorant. More than one flavorant can be used in each region and the flavorant(s) in each region can be different or the same as the flavorant(s) in another region of the product.

Exemplary flavorants (flavor, flavoring agent) that can be used include those artificial or natural flavors known in the art, for example synthetic flavor oils, natural flavoring aromatics and/or oils, oleoresins, extracts derived from plants, leaves, flowers, fruits, and the like, or a combination thereof. "Flavorant" can include one or more flavor compounds. For example, natural peppermint contains a number of components including menthol, menthone, menthyl acetate, beta-pinene, etc. As used herein "flavor compound" means a distinct molecular flavor compound such as the menthol or menthone component of natural peppermint. Flavor compounds can include those reported in the U.S. Department of Commerce's National Institute of Standards and Technology (NIST) Mass Spectral Library.

Non-limiting representative flavors include oils such as spearmint oil, cinnamon oil, oil of wintergreen (methyl salicylate), peppermint oil, clove oil, bay oil, anise oil, *eucalyptus* oil, thyme oil, cedar leaf oil, oil of nutmeg, allspice, oil of sage, mace, oil of bitter almonds, *cassia* oil, and citrus oils including lemon, orange, lime, grapefruit, vanilla, fruit essences/flavors, including apple, pear, peach, grape, strawberry, raspberry, blackberry, cherry, plum, pineapple, apricot, banana, melon, tropical fruit, mango, mangosteen, pomegranate, *papaya*, honey lemon, and the like, or a combination thereof.

Other types of flavorants include various aldehydes and esters such as cinnamyl acetate, cinnamaldehyde, citral diethylacetal, dihydrocarvyl acetate, eugenyl formate, p-methylamisol, acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, i.e., melonal (melon), 2,6-dimethyloctanal (green fruit), and 2-dodecenal (citrus, mandarin).

Sensate

Each region (e.g. the hard confectionery shell, center-fill, coating, additional regions, or a combination thereof) can optionally comprise a sensate. More than one sensate can be used in each region and the sensate(s) in each region can be different or the same as the sensate(s) in another region of the product. Exemplary sensates include cooling agents, warming agents, tingling agents, effervescent agents, or a combination thereof. Cooling agents are additives that provide a cooling or refreshing effect in the mouth, in the nasal cavity, or on skin. For example, among the useful cooling agents are included menthol, menthane, menthone, ketals, menthone ketals, menthone glycerol ketals, substituted p-menthanes, acyclic carboxamides, mono menthyl glutarate, substituted cyclohexanamides, substituted cyclohexane carboxamides, substituted ureas and sulfonamides, substituted menthanols, hydroxymethyl and hydroxymethyl derivatives of p-menthane, 2-mercapto-cyclo-decanone, hydroxycarboxylic acids with 2-6 carbon atoms, cyclohexanamides, menthyl acetate, menthyl salicylate, N,2,3-trimethyl-2-isopropyl butanamide (WS-23), N-ethyl-2,2-diisopropylbutanamide, N-ethyl-p-menthane-3-carboxamide (WS-3), ethyl ester of N-[[5-methyl-2-(1-methylethyl)cyclohexyl]carbonyl]glycine (WS-5), as well as the substantially pure ethyl ester of N-[[5-methyl-2-(1-methylethyl)cyclohexyl]carbonyl]glycine as disclosed in U.S. Pat. No. 7,189,760 to Erman, et al which is incorporated in its entirety herein by reference, isopulegol, menthyloxy propane diol, 3-(1-menthoxy)propane-1,2-diol, 3-(1-menthoxy)-2-methylpropane-1,2-diol, p-menthane-2,3-diol, p-menthane-3,8-diol, 6-isopropyl-9-methyl-1,4-dioxaspiro[4,5]decane-2-methanol, menthyl succinate and its alkaline earth metal salts, trimethylcyclohexanol, N-ethyl-2-isopropyl-5-methylcyclohexanecarboxamide, N-(4-cyanomethylphenyl) p-menthanecarboxamide (G-180), Japanese mint oil, peppermint oil, 3-(1-menthoxy) ethan-1-ol, 3-(1-menthoxy) propan-1-ol, 3-(1-menthoxy) butan-1-ol, 1-menthylacetic acid N-ethylamide, 1-menthyl-4-hydroxypentanoate, 1-menthyl-3-hydroxybutyrate, N,2,3-trimethyl-2-(1-methylethyl)-butanamide, n-ethyl-t-2-c-6 nonadienamide, N,N-dimethyl menthyl succinamide, substituted p-menthanes, substituted p-menthane-carboxamides, 2-isopropanyl-5-methylcyclohexanol (from Hisamitsu Pharmaceuticals, hereinafter "isopregol"); menthone glycerol ketals (FEMA 3807, tradename FRESCOLAT® type MGA); 3-1-menthoxypropane-1,2-diol (from Takasago, FEMA 3784); and menthyl lactate; (from Haarman & Reimer, FEMA 3748, tradename FRESCOLAT® type ML), WS-30, WS-14, *Eucalyptus* extract (p-Mehta-3,8-Diol), Menthol (its natural or synthetic derivatives), Menthol PG carbonate, Menthol EG carbonate, Menthol glyceryl ether, N-tertbutyl-p-menthane-3-carboxamide, P-menthane-3-carboxylic acid glycerol ester, Methyl-2-isopryl-bicyclo (2.2.1), Heptane-2-carboxamide; Menthol methyl ether, menthyl pyrrolidone carboxylate; 2,5-dimethyl-4-(1-pyrrolidinyl)-3 (2H)-furanone; cyclic α-keto enamines, cyclotene derivatives such as cyclopentenes including 3-methyl-2-(1-pyrrolidinyl)-2-cyclopenten-1-one and 5-methyl-2-(1-pyrrolidinyl)-2-cyclopenten-1-one, compounds of the formula:

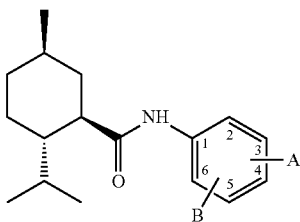

wherein B is selected from H, $CH_3$, $C_2H_5$, $OCH_3$, $OC_2H_5$; and OH; and wherein A is a moiety of the formula- CO-D, wherein D is selected from the following moieties: (i) —$NR^1R^2$, wherein $R^1$ and $R^2$ are independently selected from H and $C_1$-$C_8$ straight or branched-chain aliphatic, alkoxyalkyl, hydroxyalkyl, araliphatic and cycloalkyl groups, or $R^1$ and $R^2$ together with the nitrogen atom to which they are attached form part of an optionally-substituted, five- or six-membered heterocyclic ring; (ii) —$NHCH_2COOCH_2CH_3$, —$NHCH_2CONH_2$, —$NHCH_2CH_2OCH_3$, —$NHCH_2CH_2OH$, —$NHCH_2CH(OH)$ $CH_2OH$ and (iii) a moiety selected from the group consisting of:

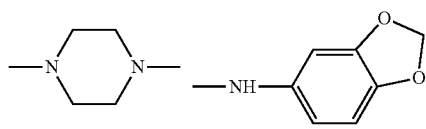

as disclosed in PCT Patent Application WO2006/125334 to Bell et al. which is incorporated in its entirety herein by reference, among others; or a combination thereof. Other compounds include the alpha-keto enamines disclosed in U.S. Pat. No. 6,592,884 to Hofmann et al. which is incorporated in its entirety herein by reference. These and other suitable cooling agents are further described in the following U.S. patents, all of which are incorporated in their entirety by reference hereto: U.S. Pat. Nos. 4,230,688; 4,032,661; 4,459,425; 4,178,459; 4,296,255; 4,136,163; 5,009,893; 5,266,592; 5,698, 181; 6,277,385; 6,627,233; 7,030,273. Still other suitable cooling agents are further described in the following U.S. Published Patent Applications, all of which are incorporated in their entirety by reference hereto: U.S. 2005/0222256; 2005/0265930.

Warming agents can be selected from a wide variety of compounds known to provide the sensory signal of warming to the user. These compounds offer the perceived sensation of warmth, particularly in the oral cavity, and often enhance the perception of flavors, sweeteners and other organoleptic components. Among the useful warming agents included are vanillyl alcohol n-butylether (TK-1000) supplied by Takasago Perfumary Company Limited, Tokyo, Japan, vanillyl alcohol n-propylether, vanillyl alcohol isopropylether, vanillyl alcohol isobutylether, vanillyl alcohol n-aminoether, vanillyl alcohol isoamylether, vanillyl alcohol n-hexylether, vanillyl alcohol methylether, vanillyl alcohol ethylether, gingerol, shogaol, paradol, zingerone, capsaicin, dihydrocapsaicin, nordihydrocapsaicin, homocapsaicin, homodihydrocapsaicin, ethanol, isopropol alcohol, iso-amylalcohol, benzyl alcohol, glycerine, or a combination thereof.

In an embodiment, tingling agents may be employed to provide a tingling, stinging or numbing sensation to the user. Tingling agents include, but are not limited to: Jambu Oleoresin or para cress (*Spilanthes* sp.), in which the active ingredient is Spilanthol; Japanese pepper extract (*Zanthoxylum peperitum*), including the ingredients known as Saanshool-I, Saanshool-II and Sanshoamide; perillartine; 4-(1-menthoxymethyl)-2-phenyl-1,3-dioxolane; black pepper extract (*Piper nigrum*), including the active ingredients chavicine and piperine; *Echinacea* extract; Northern Prickly Ash extract; trans-pellitorin, and red pepper oleoresin; or a combination thereof. In an embodiment, alkylamides extracted from materials such as jambu or sanshool may be included.

High Intensity Sweetener

Each region (e.g. the hard confectionery shell, center-fill, coating, additional regions, or a combination thereof) can optionally comprise a high intensity sweetener. More than one high intensity sweetener can be used in each region and the high intensity sweetener(s) in each region can be different or the same as the high intensity sweetener(s) in another region of the product. A "high intensity sweetener" as used herein means agents having a sweetness greater than the sweetness of sucrose. In an embodiment, a high intensity sweetener has a sweetness that is at least 100 times that of sugar (sucrose) on a per weight basis, specifically at least 500 times that of sugar on a per weight basis. In an embodiment the high intensity sweetener is at least 1,000 times that of sugar on a per weight basis, more specifically at least 5,000 times that of sugar on a per weight basis. The high intensity sweetener can be selected from a wide range of materials, including water-soluble sweeteners, water-soluble artificial sweeteners, water-soluble sweeteners derived from naturally occurring water-soluble sweeteners, dipeptide based sweeteners, and protein based sweeteners. Combinations comprising one or more sweeteners or one or more of the foregoing types of sweeteners can be used. Without being limited to particular sweeteners, representative categories and examples include:

water-soluble sweetening agents such as dihydrochalcones, monellin, steviosides, rebaudiosides, glycyrrhizin, dihydroflavenol, monatin, and L-aminodicarboxylic acid aminoalkenoic acid ester amides, such as those disclosed in U.S. Pat. No. 4,619,834, or a combination thereof;

water-soluble artificial sweeteners such as soluble saccharin salts, i.e., sodium or calcium saccharin salts, cyclamate salts, acesulfame salts, such as the sodium, ammonium or calcium salt of 3,4-dihydro-6-methyl-1, 2,3-oxathiazine-4-one-2,2-dioxide, the potassium salt of 3,4-dihydro-6-methyl-1,2,3-oxathiazine-4-one-2,2-dioxide (Acesulfame-K), the free acid form of saccharin, or a combination thereof; dipeptide based sweeteners, for example the L-aspartic acid derived sweeteners such as L-aspartyl-L-phenylalanine methyl ester (Aspartame) and materials described in U.S. Pat. No. 3,492,131, L-alpha-aspartyl-N-(2,2,4,4-tetramethyl-3-thietanyl)-D-alaninamide hydrate (Alitame), methyl esters of L-aspartyl-L-phenylglycerine and L-aspartyl-L-2,5-dihydrophenyl-glycine, L-aspartyl-2, 5-dihydro-L-phenylalanine; L-aspartyl-L-(1-cyclohexen)-alanine, neotame, or a combination thereof;

water-soluble sweeteners derived from naturally occurring water-soluble sweeteners, such as steviosides and *stevia* derived compounds such as but not limited to steviol glycosides such as rebaudiocides including rebaudiocide A, and the like, monk fruit extract, lo han quo and lo han quo derived compounds such as isomogroside V and the like, chlorinated derivatives of ordinary sugar (sucrose), e.g., chlorodeoxysugar derivatives such as derivatives of chlorodeoxysucrose or chlorodeoxygalactosucrose, known, for example, under the product designation of Sucralose; examples of chlorodeoxysucrose and chlorodeoxygalactosucrose derivatives include but are not limited to: 1-chloro-1'-deoxysucrose; 4-chloro-4-deoxy-alpha-D-galactopyranosyl-alpha-D-fructofuranoside, or 4-chloro-4-deoxy-galactosucrose; 4-chloro-4-deoxy-alpha-D-galactopyranosyl-1-chloro-1-deoxy-beta-D-fructofuranoside, or 4,1'-dichloro-4,1'-dideoxygalactosucrose; 1',6'-dichloro1',6'-dideoxysucrose; 4-chloro-4-deoxy-alpha-D-galactopyranosyl-1,6-dichloro-1,6-dideoxy-beta-D-fructofuranoside, or 4,1',6'-trichloro-4,1',6'-trideoxygalactosucrose; 4,6-dichloro-4,6-dideoxy-alpha-D-galactopyranosyl-6-chloro-6-deoxy-beta-D-fructofuranoside, or 4,6,6'-trichloro-4,6,6'-trideoxygalactosucrose; 6,1',6'-trichloro-6,1',6'-trideoxysucrose; 4,6-dichloro-4,6-dideoxy-alpha-D-galacto-pyranosyl-1,6-dichloro-1,6-dideox y-beta-D-fructofuranoside, or 4,6,1',6'-tetrachloro4,6,1',6'-tetradeoxygalacto-sucrose; 4,6,1',6'-tetradeoxy-sucrose, or a combination thereof;

protein based sweeteners such as *Thaumaoccous danielli*, talin, or a combination thereof; and amino acid based sweeteners.

Colorant

Each region (e.g. the hard confectionery shell, center-fill, coating, additional regions, or a combination thereof) can optionally comprise a colorant. More than one colorant can be used in each region and the colorant(s) in each region can be different or the same as the colorant(s) in another region of the product. Colorants (coloring agents, colors, colorings) can be used in amounts effective to produce a desired color for the particular product region. Suitable coloring agents include pigments, natural food colors and dyes suitable for food, drug, and cosmetic applications. Suitable colors include annatto extract (E160b), bixin, norbixin, astaxanthin, dehydrated beets (beet powder), beetroot red/betanin (E162), ultramarine blue, canthaxanthin (E161g), cryptoxanthin (E161c), rubixanthin (E161d), violanxanthin (E161c), rhodoxanthin (E161f), caramel (E150 (a-d)). β-apo-8'-carotenal (E160e), β-carotene (E160a), alpha carotene, gamma carotene, ethyl ester of beta-apo-8 carotenal (E160f), flavoxanthin (E161a), lutein (E161b), cochincal extract (E120), carmine (E132), carmoisine/azorubine (E122), sodium copper chlorophyllin (E141), chlorophyll (E140), toasted partially defatted cooked cottonseed flour, ferrous gluconate, ferrous lactate, grape color extract, grape skin extract (enocianina), anthocyanins (E163), haematococcus algae meal, synthetic iron oxide, iron oxides and hydroxides (E172), fruit juice, vegetable juice, dried algae meal, *tagetes* (Aztec marigold) meal and extract, carrot oil, corn endosperm oil, paprika, paprika oleoresin, phaffia yeast, riboflavin (E101), saffron, titanium dioxide, turmeric (E100), turmeric oleoresin, amaranth (E123), capsanthin/capsorbin (E160c), lycopene (E160d), FD&C blue #1, FD&C blue #2, FD&C green #3, FD&C red #3, FD&C red #40, FD&C yellow #5 and FD&C yellow #6, tartrazine (E102), quinoline yellow (E104), sunset yellow (E110), ponceau (E124), erythrosine (E127), patent blue V (E131), titanium dioxide (E171), aluminium (E173), silver (E174), gold (E175), pigment rubine/lithol rubine BK (E180), calcium carbonate (E170), carbon black (E153), black PN/brilliant black BN (E151), green S/acid brilliant green BS (E142), or a combination thereof. In an embodiment, certified colors can include FD&C aluminum lakes, or a combination thereof. A full recitation of all FD& C colorants and their corresponding chemical structures may be found in the Kirk-Othmer Encyclopedia of Chemical Technology, 4th Edition, in volume 1 at pages 492-494, which text is incorporated herein by reference.

Coloring agents can also include food grade glitter or food grade pearlescent pigments. The edible glitter can include a food grade colorant and a carrier such as a sugar, a sugar alcohol, a saccharide, a disaccharide, a polysaccharide, a hydrocolloid material, or a combination thereof. Exemplary glitter includes the commercially available Edible Glitter™ from Watson Inc. of West Haven, CT. The coloring agent can include food grade pearlescent pigments prepared from mica optionally coated with titanium dioxide, iron oxide, and the like.

The hard confectionery shell region can optionally further comprise a colorant in an amount that the center-fill composition region can be visually perceived through the shell region. In an embodiment, the hard confectionery shell region comprises glitter or other speckles. In an embodiment, the hard confectionery shell region may be transparent, translucent, or clear-and-colorless. In an embodiment, the hard confectionery shell region contains a colorant in an amount to allow the center-fill region to be visible.

Food Acid or Salt Thereof

The center-fill region contains an effervescent composition comprising a food acid. Furthermore, each of the hard confectionery shell and the coating region, or a combination thereof can optionally comprise a food acid or salt thereof. More than one food acid or salt thereof can be used in each region and the food acid or salt thereof in each region can be different or the same as the food acid or salt thereof in another region of the product.

The food acid can be in free or buffered form. Exemplary food acids and food acid salts include acetic acid, adipic acid, ascorbic acid, butyric acid, citric acid, formic acid, fumaric acid, glyconic acid, lactic acid, phosphoric acid, malic acid, oxalic acid, succinic acid, tartaric acid, and alkali or alkaline earth metal salts thereof (e.g., sodium citrate dihydrate), or a combination thereof.

Functional Ingredients

Exemplary functional ingredients for use in the product include a breath freshener, a dental or oral care agent, an herbal, an appetite suppressor, a vitamin, a micronutrient, a mouth moistening agent, a throat care agent, an energy boosting agent, a concentration boosting agent, or a combination thereof.

Processes to Make the Hard Confectionery for the Shell Region

The hard confectionery products can be prepared by methods known in the art of hard confectionaries, for example, hard-boiled confectionaries. Particular apparatus for making the hard confectionery composition region includes cooking and mixing apparatus known in the confectionery manufacturing arts, and appropriate apparatus will be apparent to the skilled artisan.

In general, preparation of the hard confectionery composition of the shell region includes mixing and heating, forming a hard confectionery composition melt of a saccharide or a substantially non-hygroscopic sugar polyol and optionally, other sugar components and/or a diluent such as water; cooking the melt; removing excess moisture from the melt, for example reducing the moisture content to less than about 2 to about 3 weight percent based on the total weight of the melt; cooling the melt through mixing until the melt is a workable mass having a plastic-like consistency; while the melt is a plastic-like mass, incorporating optional additional ingredients such as flavor, color, etc.; and forming the plastic-like mixture into a hard confectionery product having the desired size and shape. The process may further include a step of forming a center-fill region in the hard confectionery product surrounded by the hard confectionery composition in the form of a shell.

The moisture content of the hard confectionery composition melt can be about 0 to about 5 wt. % based on the total weight of the hard confectionery composition melt, specifically about 0.5 to about 4 wt. %, and yet more specifically about 1 to about 3 wt. %.

Methods known in the art of making hard boiled confectionaries include those utilizing fire cookers, vacuum cookers, and scraped-surface cookers, also known as high speed atmospheric cookers.

In one method utilizing fire cookers, the desired quantity of the saccharide or substantially non-hygroscopic sugar polyol and any other sugar components are dissolved in water by heating them in a kettle until dissolved. Additional saccharide and/or sugar polyol components can be added and cooking continued until a final temperature of about 145 to about 165 degrees Celsius is achieved. The mix is then cooled, worked into a plastic-like mass, and admixed with optional ingredients such as flavors, colorants, buffering agents, high intensity sweeteners, and other optional additional ingredients.

A suitable example of a method utilizing vacuum cookers, the saccharide components are boiled at a temperature of about 125 to about 132 degrees Celsius, a vacuum is applied and additional water is boiled off without extra heating. When cooking is complete, the composition is a semi-solid mass having a plastic-like consistency. Optional additional ingredients are admixed into the mass by conventional methods.

In a method using scraped-surface cookers, a film of a mixture of the saccharide components is spread onto a heat exchange surface and heated to about 165 to about 170 degrees Celsius within a few minutes. The composition is then rapidly cooled to about 100 to about 120 degrees Celsius and worked into a plastic-like mass, wherein optional additional ingredients are admixed into the mass.

In the foregoing methods, the cooking temperature should be sufficiently high to drive water from the mix. Where a vacuum is employed, lower temperatures can typically be used. In the foregoing methods, the additive(s) are specifically mixed for a time effective to provide a uniform distribution of the materials, for example, about 4 to about 10 minutes. Once the composition has been properly tempered, it can be cut into workable portions or otherwise formed into desired shapes and sizes using forming techniques such as those that are known in the art. The resulting hard confectionery composition melt can optionally be fed directly into a process to prepare the center-filled product.

The process of preparation can be adapted by those skilled in the art to provide hard confectionery products having a desired configuration, including single-layer, multi-layer having two or more layers (for example, three layers), and forms having a center-filled core.

Processes to Make the Center-Filled Confectionery

In an embodiment, the method of preparing a center-filled hard confectionery product comprises extruding a center-filled rope of a hard confectionery composition melt, wherein the rope includes a center-fill composition; sizing the center-filled rope; feeding the sized center-filled rope into a forming mechanism; forming individual pieces of the sized center-filled rope; and optionally coating at least a portion of the surface of the individual pieces to form the coated center-filled hard confectionery product.

Coating Processes

The center-fill hard confectionery product may optionally be coated, e.g. with a soft coating, hard coating, or sanded. Soft panned, hard panned, and sanding processes known in the art can be used in the process to coat the center-fill hard confectionery product pieces. In an embodiment, the coating process involves a soft panning process to form a soft panned coated center-fill hard confectionery product.

In an embodiment, a center-filled hard confectionery product comprises a center-fill region comprising at least one effervescent composition; at least one hard confectionery shell region comprising a hard boiled candy; at least one coating region that is not a hard boiled candy, specifically a soft panned coating, a hard panned coating, or a sanded coating; and wherein the hard confectionery shell region, and optionally the center-fill region, the coating region, or a combination thereof, comprises at least one flavorant. In a further embodiment, at least the shell region flavorant or the coating region flavorant exhibits increased flavor release upon exposure of the center-fill region to a solvent such as water, and wherein the flavor release is at least 225% greater than the baseline before center-fill region exposure to the solvent, specifically about 250% to about 500%, more specifically about 275% to about 450%, and yet more specifically about 300% to about 400%. In a further embodiment, the flavor release can be measured using Proton-transfer-reaction Time of Flight mass spectrometry (PTR-MS).

In an embodiment, a center-filled hard confectionery product comprises a center-fill region comprising at least one effervescent composition or comprising at least one powder or particulate composition; at least one hard confectionery shell region comprising a hard boiled candy; at least one coating region excluding a hardboiled candy; wherein the hard confectionery shell region, and optionally the center-fill region, the coating region, or a combination thereof, comprises at least one flavorant; wherein at least the shell region flavorant or the coating region flavorant exhibits increased flavor release upon exposure of the center-fill region to a solvent; and wherein at least the shell region flavorant or the coating region flavorant exhibits increased flavor release upon exposure of the center-fill region to a solvent; and wherein the flavor release rate ratio before and after center-fill exposure increases by at least 150%, specifically about 225% to about 800%, more specifically about 250% to about 700%, and yet more specifically about 300% to about 600%, and still more specifically about 400% to about 500% due to the center-fill composition for a flavorant contained in the coating region or hard confectionery shell region. In a further embodiment, the flavor release can be measured using Proton-transfer-reaction Time of Flight mass spectrometry (PTR-MS).

The features and advantages are more fully shown by the following examples that are provided for purposes of illustration, and are not to be construed as limiting the invention in any way. The foregoing and other embodiments are further illustrated by the following examples, which are not intended to limit the effective scope of the claims. All parts and percentages in the examples and throughout the specification and claims are by weight of the final composition unless otherwise specified.

EXAMPLES

Example 1

Soft panned coated, powder center-filled hard confectionery products are prepared with a hardboiled candy shell. The center-fill composition contains an effervescent composition. The weight ratio of Coating:Shell:Center-fill was 5.1:90.2:4.7. The shell composition is set out in Table 1, the center-fill composition in Table 2, and the coating composition in Table 3.

TABLE 1

Hard confectionery shell composition

| Component | % by weight |
| --- | --- |
| Isomalt | 95.88-99.95 |
| High intensity sweetener | 0-0.12 |
| Flavor | 0.05-2.6 |
| Food acid | 0-1.38 |
| Processing aid | 0-0.01 |
| Color | 0-0.01 |
| Total | 100 |

TABLE 2

Center-fill composition

| Component | % by weight |
| --- | --- |
| Isomalt (crystalline particles), xylitol, etc. | 75.75-86 |
| Sodium hydrogen carbonate | 8-0 |
| Food acid (e.g. Citric acid, anhydrous) | 6-9 |
| Flavor | 0-2 |
| Color | 0-0.15 |
| High intensity sweetener | 0-0.1 |
| Magnesium stearate | 0-3 |
| Total | 100 |

TABLE 3

Coating composition

| | % by weight |
| --- | --- |
| Coating Syrup Component | |
| Xylitol | 40-55 |
| Gum arabic | 7-13 |
| Food acid | 0-15 |
| Color | 0-1.5 |
| High intensity sweetener | 0-0.5 |
| Water | 20-30 |
| Total | 100 |
| Coating Powder Blend Component | |
| Xylitol | 80-85 |
| Gum arabic | 15-20 |
| Total | 100 |
| Coating Component | |
| Coating syrup | 18-28 (dry weight) |
| Flavor | 0-2 |
| Coating Syrup Component | |
| Coating Powder | 22-32 |
| Xylitol powder | 40-55 |
| Carnauba wax | 0.7-1.0 |
| Total | 100 |

A hard confectionery shell composition was prepared according to the composition in Table 1 above. The shell is generally prepared by cooking a mixture of isomalt and water at about 155° C., optionally under vacuum to achieve a moisture content at or below 3 wt. %. The cooked mixture is cooled slightly and high intensity sweetener, flavor, food acid, color, etc., if used, are added to the cooled mixture to form a shell melt which is maintained as a melt for the center-fill process.

The center-fill composition of Table 2 is generally prepared by homogeneously blending the center-fill ingredients.

The coating syrup is generally prepared by combining the ingredients noted in Table 3 with heating to form a syrup.

The coating powder blend of Table 3 is generally prepared by adding the ingredients together and forming a homogeneous blend.

The center-filled, hard confectionery product is generally prepared by an extrusion process where a rope of the melt shell material is formed with a powder center-fill of the center-fill composition. The rope is sized and then fed to a forming mechanism to form uncoated, center-filled hard confectionery pieces. The pieces are then soft panned coated with alternating layers of coating syrup and coating powder composition or particulate xylitol to achieve a soft-panned coating according to Table 3.

Example 2: Structural Analysis

Structural analysis of the final confectionery product from microscopy shows successful production three distinct regions in the product: a soft panned outer coating region surrounding a hard boiled candy shell region, which in turn surrounds a powder center-fill region. The analysis included scanning electron microscopy, light microscopy, and Micro-CT scanning and photographs of sectioned confectionery product. The coating region was shown as having a distinct border with the hard boiled candy shell region both in light microscopy as well as electron scanning microscopy. The powder center-fill region can easily be shown in micro-CT as light microscopy.

Example 3: Flavor Release Analysis

The distinct regions of the final confectionery product also lead to distinct flavor release profiles. Demonstrated below is use of the various product regions to introduce flavors in a controlled way at distinct time points during consumption. Testing was completed using Proton-transfer-reaction Time of Flight mass spectrometry (PTR-MS) to establish flavor release profiles.

Prior to the PTR-MS experiments, gas chromatography-mass spectrometry (GC-MS) analysis of the regions of the confectionery product was used initially to identify the flavor compounds in each region. One confectionery product sample or one region of the confectionery product was dissolved in 20 ml Milli-Q® (purified) water and 20 ml dichloromethane for 90 minutes with stirring using a magnetic stirrer. The dichloromethane layer was then filtered into a GC vial and analyzed using GC-MS. Flavor compounds were identified through their mass spectra using the NIST library.

The PTR-MS experiments were conducted using the following procedure. A 4-neck round bottom flask (1 L volume) was heated in a water bath (37° C.). 30 mL of Milli-Q® water was injected into the flask and warmed up for 5 minutes under stirring using a magnetic stirrer. One confectionery product sample was put into the flask and measurements were taken until the confectionery dissolved completely (~8 minutes) upon stirring using a magnetic stirrer. The concentration of volatile flavor compounds was measured from the gas above the surface of the water containing the confectionery product. Measurements were carried out in duplicate. Background (average of 30 seconds measuring the flask with 30 mL Milli-Q® water) was subtracted from each volatile compound and release curves were drawn as an average of the duplicate measurements. FIG. 1 illustrates the in vitro PTR-MS analysis set-up and example time-intensity curves (time in seconds versus intensity m/z of a flavor compound). A flavor compound is defined as a m/z value as seen on a PTR-MS and/or GC-MS results. These can correspond to one or more flavor chemical compounds by attributing the mass spectra to the corresponding compound using the NIST library.

Figure 2:
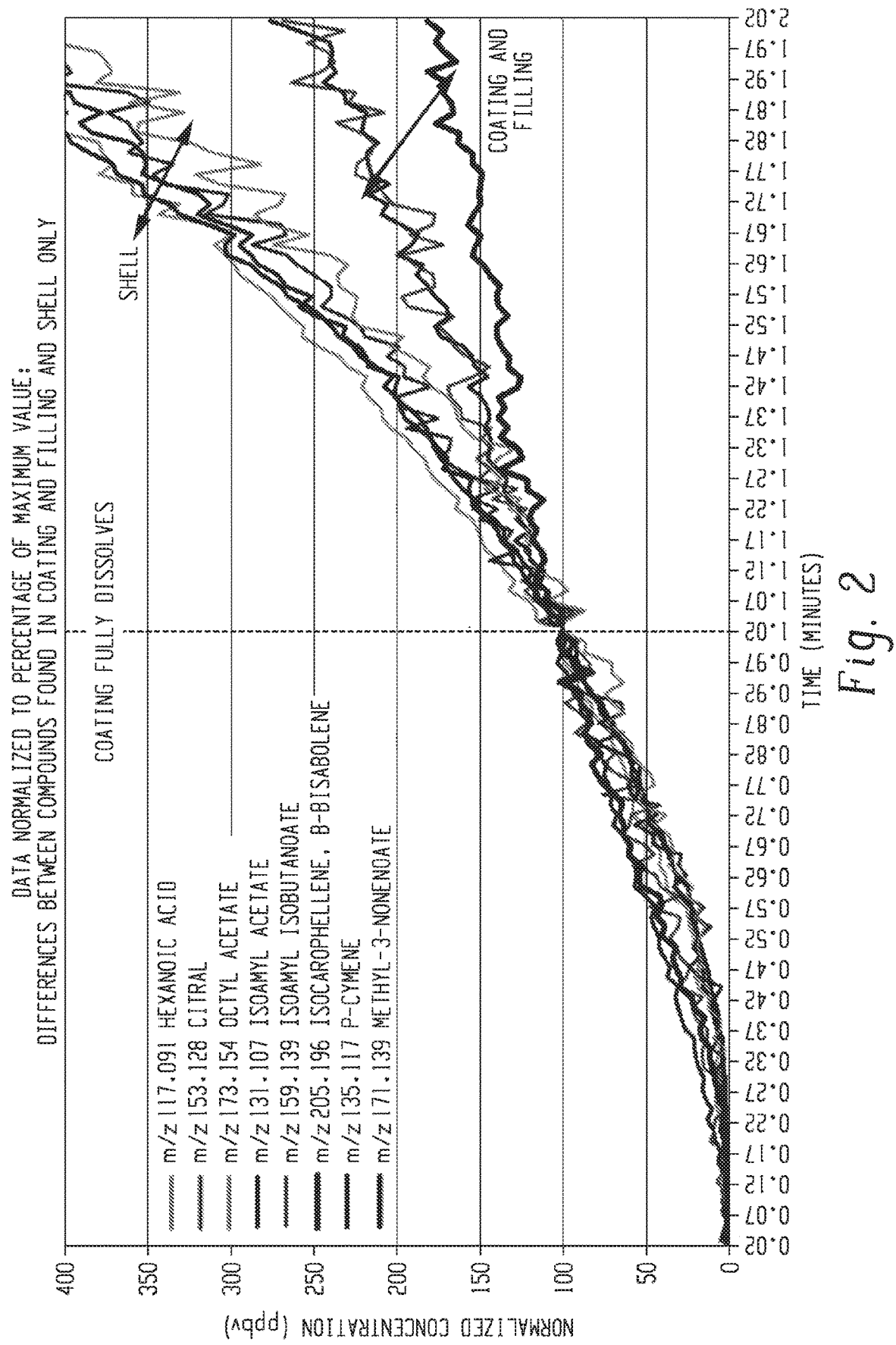
FIG. 2 illustrates the normalized PTR-MS concentrations of the flavor compounds released from the coating region, center-fill region, and shell region of a sample product before and after coating dissolution.

FIG. 2 shows flavor compounds in the shell and coating regions of a final product, when normalized to the concentration at the point of full coating dissolution. At a sufficient time prior to coating full dissolution, the figure demonstrates the normalized PTR-MS concentrations of the flavor compounds from the coating and shell are roughly comparable, with the shell being on average lower. Sufficiently after coating full dissolution, the shell flavor compounds normalized concentration in the PTR-MS show a higher composition than the coating flavor compounds.

Figure 3:
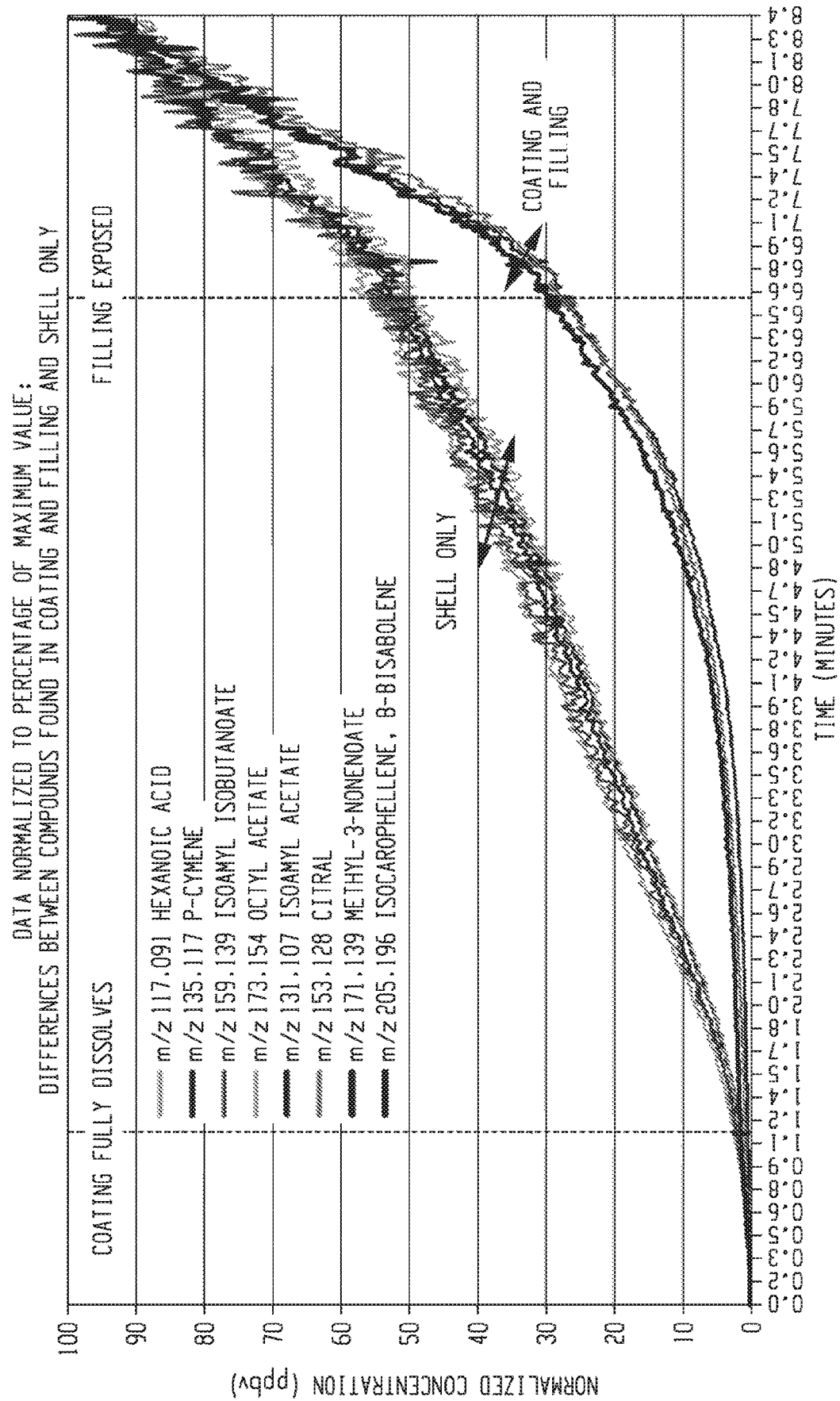
FIG. 3 illustrates the normalized PTR-MS concentrations of the flavor compounds released from the coating region, center-fill region, and shell region of a sample product before and after coating dissolution and before and after center-fill exposure to the solvent.
Figure 4:
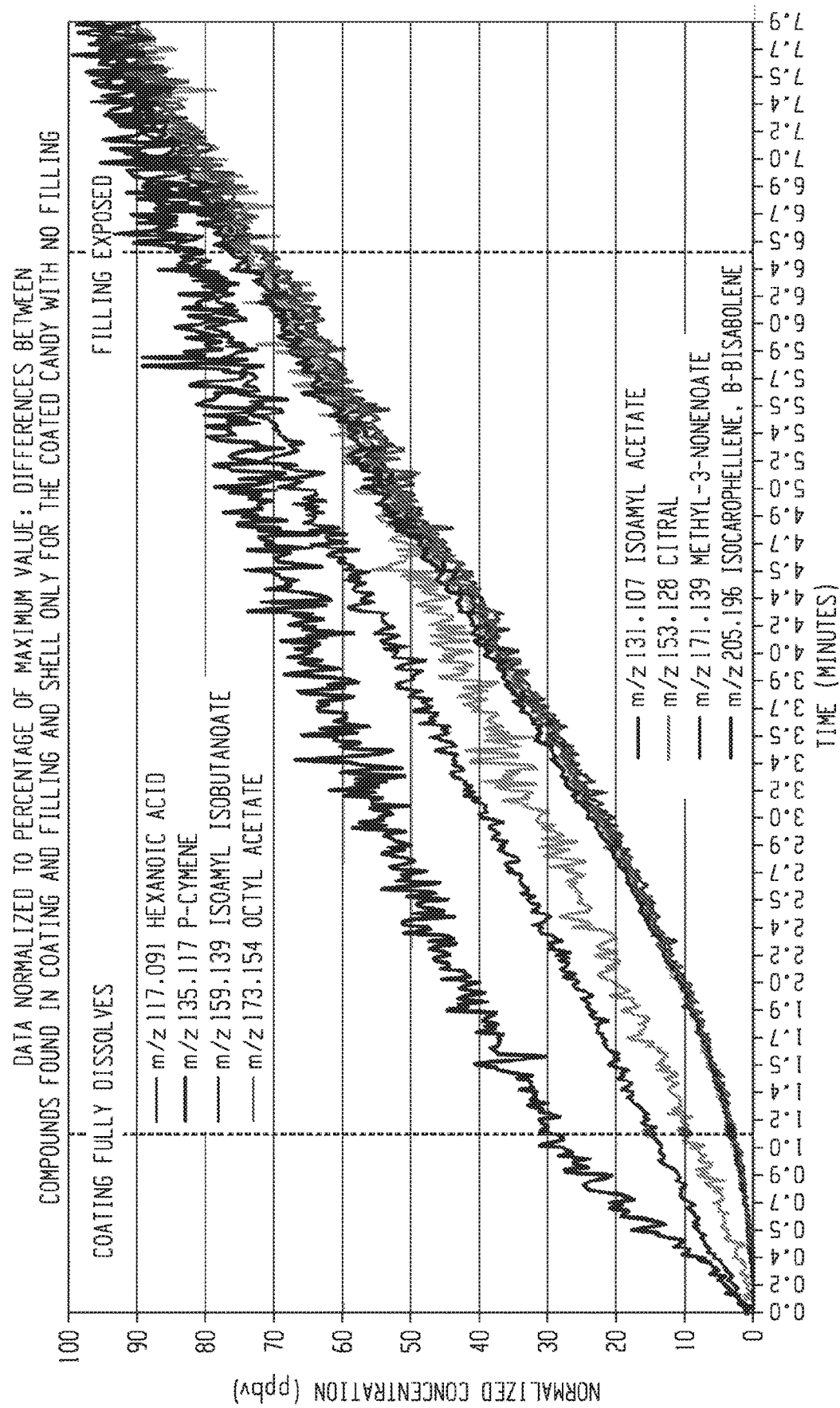
FIG. 4 illustrates the normalized PTR-MS concentrations of the flavor compounds released from the coating region and shell region of a sample product without a center-fill region, the flavor release is reported before and after coating dissolution and for a time when it would be expected that the center of the shell would be exposed to the solvent.

Sufficiently after the hard confectionery shell region is exposed, flavor compounds in the hard confectionery shell region are the higher than the coating region and center-fill region flavor compounds when normalized to the final concentrations over the full PTR-MS measurement period. Then, when the center-fill region is exposed to the water, the flavor compounds contained in the hard confectionery shell region accelerate their release relative to before center-fill exposure. This can be shown through the increase is average slope of the flavor compound concentrations after the center-fill region is exposed to water (FIG. 3), versus products made without a center-fill region (FIG. 4). The enhanced flavor compound release result was unexpected given the fact that the flavor compounds showing enhanced release are not contained in the center-fill region. These results suggest that the effervescent composition of the center-fill region accelerates the release rates of flavor compounds from surrounding regions (shell and/or coating regions). In addition, the flavor compounds in the coating region can be formulated to be the same as in the center-fill region, thereby further accelerating the release rate of the flavor compound. By contrast, when there is no center-fill in the product, the average slopes for all flavor compounds (shell and coating) did not demonstrate an increase in release rate. See FIG. 4.

Flavor compounds of interest that were measured using PTR-MS are shown in Table 4 below along with the region of the product the compound is located.

Flavor compound release rate of a coated center-filled hard confectionery product was measured as the slope of the line generated from a linear least squares curve fitting to the PTR-MS measured normalized flavor compound concentration in the gas above the solvent versus dissolution time. Two time periods were linearly fitted fit by least squares method: 4½-5½ minute of dissolution (significantly before exposure of the center-fill region to the solvent system) and 7-8 minutes (significantly after exposure of the center-fill region to the solvent system). Coated hard confectionery product without the center-fill region was compared to coated, center-filled hard confectionery product, where the absence of the center-fill region was the only difference between the two products. Flavor compound concentrations were normalized from 0-100% where 100% is a maximum concentration observed over the test period. Slopes are reflected in % ppm per minute.

In the coated hard confectionery product without the center-fill region, the ratio of the pre-"center-fill exposure" flavor compound release rate as compared to slope of flavor release after the time point when the center-fill would have been exposed ranged from 64-221%, depending on the flavor compound studied. This is compared to the coated, center-filled hard confectionery product, which demonstrated a ratio between 226-800%, depending on the flavor compound studied. The results include flavor compounds only contained in the coating region, only contained in the shell region, or only contained in the coating and shell regions. These results show the center-fill region comprising the effervescent composition is capable of significantly increasing the release rate of flavor compounds not contained in the center-fill region. If this ratio is defined as the increase in slope, the ratio of increases in slope of coated center-filled hard confectionery product to non-center-filled product varied from 158-782%, showing the finding is a significant increase in slope, even for flavors not contained in the center-fill region. The result of the analysis are provided in Table 4 for the coated non-center-filled hard confectionery product "No Center-fill" and the coated center-filled hard confectionery product "Center-fill".

TABLE 4

Flavor Compound Release

| | Found in | | | No Center-fill | | | Center-fill | | | |
|---|---|---|---|---|---|---|---|---|---|---|
| Flavor Compound | Coating | Shell | Center-fill | Slope before center-fill exposure | Slope after center-fill exposure | Ratio of before exposure to after exposure | Slope before center-fill exposure | Slope after center-fill exposure | Ratio of before exposure to after exposure | Ratio of unfilled candy to filled candy |
| m/z 117.091 hexanoic acid | No | Yes | No | 14.35 | 15.18 | 106% | 10.33 | 23.36 | 226% | 154% |
| m/z 131.107 isoamyl acetate | No | Yes | No | 14.75 | 15.14 | 103% | 10.04 | 25.47 | 254% | 168% |

TABLE 4-continued

Flavor Compound Release

| | Found in | | | No Center-fill | | | Center-fill | | | |
|---|---|---|---|---|---|---|---|---|---|---|
| Flavor Compound | Coating | Shell | Center-fill | Slope before center-fill exposure | Slope after center-fill exposure | Ratio of before to after exposure | Slope before center-fill exposure | Slope after center-fill exposure | Ratio of before to after exposure | Ratio of unfilled candy to filled candy |
| m/z 163.076 methyl cinnamate | No | Yes | No | 16.27 | 19.55 | 120% | 9.73 | 27.86 | 286% | 143% |
| m/z 171.139 methyl-3-nonenoate | No | Yes | No | 14.90 | 13.28 | 89% | 9.53 | 26.76 | 281% | 202% |
| m/z 141.128 melonal | No | Yes | No | 13.72 | 12.46 | 91% | 8.62 | 32.45 | 376% | 260% |
| m/z 159.139 isoamyl isobutanoate | No | Yes | No | 14.58 | 14.68 | 101% | 9.96 | 25.90 | 260% | 176% |
| m/z 173.154 octyl acetate | No | Yes | No | 13.52 | 14.39 | 106% | 9.12 | 25.36 | 278% | 176% |
| m/z 143.107 cis-3-hexenylacetate | No | Yes | No | 12.49 | 12.39 | 99% | 7.66 | 34.95 | 457% | 282% |
| m/z 109.065 benzyl alcohol | Yes | No | No | 13.45 | 17.49 | 130% | 7.34 | 38.17 | 520% | 218% |
| m/z 127.112 6-methyl-5-hepten-2-one | Yes | Yes | No | 14.14 | 15.47 | 109% | 8.34 | 32.02 | 384% | 207% |
| m/z 133.065 cinnamaldehyde | Yes | Yes | No | 9.98 | 6.76 | 68% | 7.41 | 38.88 | 525% | 575% |
| m/z 145.086 ethyl levulate | No | Yes | No | 13.64 | 15.72 | 115% | 9.08 | 29.96 | 330% | 191% |
| m/z 101.097 cis-3-hexen-1-ol | No | Yes | No | 14.63 | 13.55 | 93% | 8.68 | 35.71 | 411% | 264% |
| m/z 153.055 villin | No | Yes | No | 15.64 | 15.93 | 102% | 7.29 | 33.31 | 457% | 209% |
| m/z 129.055 furaneol | No | Yes | No | 11.41 | 15.74 | 138% | 8.22 | 32.92 | 400% | 209% |
| m/z 185.154 peach lactone | No | Yes | No | 7.96 | 17.61 | 221% | 7.09 | 38.22 | 539% | 217% |
| m/z 177.092 cinnamyl acetate | No | Yes | No | 15.67 | 12.02 | 77% | 6.48 | 41.89 | 646% | 348% |
| m/z 165.092 raspberry ketone | No | Yes | No | 13.52 | 17.08 | 126% | 7.49 | 34.23 | 457% | 200% |
| m/z 199.170 isomenthol acetate | Yes | Yes | No | 14.70 | 15.07 | 103% | 7.60 | 35.48 | 467% | 235% |
| m/z 155.144 1,4-cineole, eucalyptol, 1-terpinol etc. | Yes | Yes | Yes | 14.65 | 15.15 | 104% | 8.37 | 34.52 | 412% | 228% |
| m/z 171.081 diphenyl ether | Yes | Yes | Yes | 15.14 | 15.52 | 102% | 9.63 | 24.51 | 254% | 158% |
| m/z 135.177 p-cymene | Yes | No | Yes | 12.18 | 9.98 | 82% | 6.47 | 43.01 | 665% | 431% |
| m/z 153.128 citral | Yes | No | Yes | 10.98 | 14.04 | 128% | 6.02 | 40.54 | 673% | 289% |
| m/z 205.196 isocarophellene, b-bisabolene | Yes | No | Yes | 7.97 | 5.07 | 64% | 6.90 | 39.65 | 574% | 782% |
| m/z 157.159 menthol | Yes | Yes | Yes | 12.95 | 15.39 | 119% | 8.35 | 32.09 | 384% | 209% |
| m/z 285.279 stearic acid | Yes | No | Yes | 11.37 | 10.25 | 90% | 5.46 | 43.74 | 800% | 427% |
| m/z 257.248 palmitic acid | Yes | No | Yes | 14.60 | 16.60 | 114% | 5.13 | 39.97 | 780% | 241% |

The same in vitro PTR-MS experiment was repeated for two comparative center-filled candies, Comparatives A and B. Comparative sample A is a three layered soluble confection including a jelly layer, an opaque chewy candy layer and an outer sanding layer. The results of the PTR-MS analysis revealed there was no distinguishable trend between flavor compound release from flavor compounds contained in different layers of the comparative sample. Similarly, there is no abrupt and consistent increase in flavor compound release rate. Measuring slope at the same two time intervals, the percent increase in slope for Comparative A varied between 22-110%, significantly less than the invention example tested. The results of the analysis are provided in Table 5.

Comparative B is a sour powder center-filled hard candy with no coating layer. The results of the PTR-MS analysis revealed there was no distinguishable trend between flavor compounds released from the different regions as all but one flavor compound was found in the shell primarily. Similarly, there is no abrupt and consistent increase in flavor compound release rate after full exposure of the center-fill to the solvent. Measuring slope at the same time intervals, the percent increase in slope after center-fill exposure varied between 133-214%, less than the invention example tested. The center-fill exposure for Comparative B sample occurred at roughly 6 and half minutes. The results of the analysis are provided in Table 6.

TABLE 5

Comparative A Flavor Compound Release

| | Found in | | | Comparative A | | |
|---|---|---|---|---|---|---|
| | | | | Flavor Release Rate (slope) before center-fill | Flavor Release Rate (slope) After center-fill | Ratio of before exposure |
| Flavor Compound | Whole Candy | Shell | Center-fill | exposure % max ppm/minute | exposure % max ppm/minute | to after exposure |
| m/z 89.09700 isoamyl alcohol, 1-pentanol | Y | N | Y | 12.88 | 12.13 | 0.94 |
| m/z 97.02900 furfural | Y | N | Y | 11.40 | 10.66 | 0.94 |
| m/z 99.04500 furfural alcohol | Y | N | Y | 11.81 | 12.61 | 1.07 |
| m/z 103.11200 1,2-hexanol | Y | Y | Y | 10.39 | 11.38 | 1.09 |
| m/z 107.05000 benzaldehyde | Y | N | Y | 9.40 | 5.06 | 0.54 |
| m/z 127.03952 maltol, HMF | Y | N | Y | 14.88 | 14.47 | 0.97 |
| m/z 127.11200 6-mehtyl-5-heptene-2-one | Y | Y | Y | 15.19 | 14.96 | 0.98 |
| m/z 141.12790 E-2-nonenal, melonal | Y | N | Y | 13.58 | 11.95 | 0.88 |
| m/z 145.12300 ethyl-2-methylvalerate, ethyl hexanoate, hexyl acetate | Y | Y | Y | 14.10 | 13.70 | 0.97 |
| m/z 155.10699 folione, methyl-2-octynoate | Y | Y | N | 13.53 | 14.60 | 1.08 |
| m/z 171.08099 diphenyl_ether | Y | Y | Y | 14.02 | 10.87 | 0.78 |
| m/z 171.13850 methyl-3-nonenoate | Y | Y | Y | 14.04 | 10.71 | 0.76 |
| m/z 173.15416 isoamyl-3-methylbutanoate, ethyl octanoate | Y | Y | Y | 12.67 | 12.84 | 1.01 |

TABLE 6

Comparative B Flavor Compound Release

| | Found in | | | Comparative B | | |
|---|---|---|---|---|---|---|
| | | | | Flavor Release Rate (slope) before center-fill | Flavor Release Rate (slope) After center-fill | Ratio of before |
| Flavor Compound | Whole Candy | Shell | Center-fill | exposure % max ppm/minute | exposure % max ppm/minute | exposure to after exposure |
| m/z 61.02800 acetic_acid | Y | Y | Y | 12.58 | 18.54 | 1.473665 |
| m/z 89.09700 isoamyl alcohol, 1-pentanol | Y | Y | Y | 13.55 | 17.96 | 1.325651 |
| m/z 103.11200 1,2-hexanol | Y | Y | Y | 5.97 | 12.58 | 2.104972 |
| m/z 117.09156 Hexanoic_acid | Y | Y | Y | 12.59 | 19.92 | 1.58144 |
| m/z 131.10721 ethyl-2-methylbutanoate, Isoamyl_acetate | Y | Y | Y | 9.71 | 16.04 | 1.651849 |
| m/z 141.05499 ethyl maltol | Y | Y | Y | 10.84 | 23.24 | 2.143438 |
| m/z 145.12300 ethyl-2-methylvalerate, ethyl hexanoate, hexyl acetate | Y | Y | Y | 11.52 | 17.22 | 1.494599 |
| m/z 187.20599 1-dodecanol | Y | Y | Y | 12.97 | 23.44 | 1.807675 |
| m/z 141.12790 E-2-nonenal, melonal | Y | Y | N | 12.23 | 23.51 | 1.923267 |
| m/z 97.02900 furfural | Y | N | Y | 11.97 | 22.47 | 1.876395 |
| m/z 99.04500 furfural alcohol | Y | N | Y | 12.73 | 20.91 | 1.642682 |

TABLE 6-continued

Comparative B Flavor Compound Release

| | Found in | | | Comparative B | | |
|---|---|---|---|---|---|---|
| Flavor Compound | Whole Candy | Shell | Center-fill | Flavor Release Rate (slope) before center-fill exposure % max ppm/minute | Flavor Release Rate (slope) After center-fill exposure % max ppm/minute | Ratio of before exposure to after exposure |
| m/z 101.09664 hexanal, cis-3-hexan-1-ol | Y | N | Y | 13.02 | 24.25 | 1.862791 |
| m/z 119.06400 succinic acid | Y | N | Y | 13.14 | 17.71 | 1.347731 |
| m/z 173.15416 isoamyl-3-methylbutanoate, ethyl octanoate | Y | N | Y | 13.00 | 18.76 | 1.442885 |
| m/z 187.17000 isopentyl hexanoate | Y | N | Y | 13.12 | 23.67 | 1.80362 |
| m/z 201.18500 hexyl hexanoate, ethyl decanoate | Y | N | Y | 13.15 | 17.78 | 1.351921 |
| m/z 215.20100 isoamyl octanoate | Y | N | Y | 12.88 | 20.99 | 1.628898 |
| m/z 229.21700 ethyl laurate | Y | N | Y | 13.97 | 19.83 | 1.419801 |

As used herein the terms "comprising" (also "comprises," etc.), "having," and "including" is inclusive (open-ended) and does not exclude additional, unrecited elements or method steps.

The singular forms "a," "an," and "the" include plural referents unless the context clearly dictates otherwise. For example, both the phrase "at least one of [element]" and the phrase "a/an [element]" can include one or more of the element.

The endpoints of all ranges directed to the same characteristic or component are independently combinable, and inclusive of the recited endpoint.

The term "a combination thereof" means that two or more elements of the recited group are present in the combination.

The word "or" means "and/or."

While the invention has been described with reference to an exemplary embodiment, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A center-filled hard confectionery product, comprising:
   a center-fill region comprising at least one effervescent composition;
   at least one hard confectionery shell region comprising a hard boiled candy;
   at least one coating region comprising a soft panned coating; and
   wherein the hard confectionery shell region, the coating region, and optionally the center-fill region comprises at least one flavorant.

2. The confectionery of claim 1,
   wherein the hard confectionery shell region, the coating region, and optionally the center-fill region comprises at least one flavorant;
   wherein at least the shell region flavorant or the coating region flavorant exhibits increased flavor release upon exposure of the center-fill region to a solvent; and
   wherein the flavor release is at least 225% greater than the baseline before center-fill region exposure.

3. The confectionery of claim 1,
   wherein the hard confectionery shell region, the coating region, and optionally the center-fill region comprises at least one flavorant;
   wherein at least the shell region flavorant or the coating region flavorant exhibits increased flavor release upon exposure of the center-fill region to a solvent; and
   wherein the flavor release rate ratio before and after center-fill exposure increases by at least 150% due to the center-fill composition for a flavorant contained in the coating region or hard confectionery shell region.

4. The confectionery of claim 1,
   wherein the hard confectionery shell region, the coating region, and optionally the center-fill region comprises at least one flavorant;
   wherein at least the shell region flavorant and the coating region flavorant exhibits increased flavor release upon exposure of the center-fill region to a solvent; and
   wherein the flavor release rate ratio before and after center-fill exposure increases by at least 150% due to the center-fill composition for a flavorant contained in the coating region or hard confectionery shell region.

5. The confectionery of claim 1, wherein the center-fill region comprises a powder composition or a particulate composition.

6. The confectionery of claim 1, wherein the center-fill region comprises xylitol, erythritol, maltitol, mannitol, sorbitol, polyglycitol, isomalt, sugar, glucose, allulose, tagatose, lactose, fructose, or a combination thereof; plant or fruit powders, particles or dehydrates.

7. The confectionery of claim 1, wherein the effervescent composition comprises a food acid, specifically citric, lactic, tartaric, fumeric, malic or a combination thereof; and wherein effervescent composition comprises an alkali, alkaline earth metal, or Group 8 metal carbonate or bicarbonate, specifically a sodium, potassium, calcium, magnesium, or ferrous carbonate or bicarbonate, or a combination thereof.

8. The confectionery of claim 1, wherein the center-fill region, hard confectionery shell region, and coating region comprises a sugar polyol having a negative enthalpy of dissolution.

9. The confectionery of claim 1, wherein the hard confectionery shell region completely surrounds the center-fill region.

10. The confectionery of claim 1, wherein the coating region partially or completely surrounds the hard confectionery shell region.

11. The confectionery of claim 1, wherein the hard confectionery shell region comprises aspartame, sucralose, acesulfame potassium, steviol glycosides, monk fruit extract, xylitol, erythritol, maltitol, mannitol, sorbitol, polyglycitol, isomalt, sucrose, honey, plant or fruit based syrups, juices, powders or concentrates, glucose, allulose, xylose, arabinose, tagatose, lactose, fructose, kestose, isomaltulose, isomalto-oligosaccharides, gentio-oligosaccharides, cellodextrins, raffinose, maltodextrin, beta-glucans, oligodextran, polydextrose, or a combination thereof.

12. The confectionery of claim 1, wherein the center-fill region or the coating region comprises aspartame, sucralose, acesulfame potassium, steviol glycosides, monk fruit extract, xylitol, erythritol, maltitol, mannitol, sorbitol, polyglycitol, isomalt, sucrose, glucose, allulose, xylose, arabinose, tagatose, lactose, fructose, kestose, isomaltulose, isomalto-oligosaccharides, gentio-oligosaccharides, cellodextrins, raffinose, maltodextrin, beta-glucans, oligodextran, polydextrose, or a combination thereof.

13. The confectionery of claim 1, wherein a shell region flavorant, a coating region flavorant or a combination thereof exhibits an increased flavor release rate, as measured in a solvent or a gas phase above the solvent, upon exposure of the center-fill region during contact of the confectionery product with the solvent.

14. The confectionery of claim 13, wherein the flavor release rate is at least 225% greater after center-fill exposure than before center-fill exposure for a flavorant contained in the coating region or hard confectionery shell region.

15. The confectionery of claim 13, wherein the flavor release rate ratio before and after center-fill exposure increases by at least 150% due to the center-fill composition for a flavorant contained in the coating region or hard confectionery shell region.

16. A method of preparing the center-filled hard confectionery product of claim 1, comprising:
extruding a center-filled rope of a hard confectionery composition melt, wherein the rope includes a center-fill composition;
sizing the center-filled rope;
feeding the sized center-filled rope into a forming mechanism;
forming individual pieces of the sized center-filled rope; and
coating at least a portion of the surface of the individual pieces to form the coated center-filled hard confectionery product.

17. A method for enhancing the flavor of a hard confectionery product which comprises an effervescent center-fill surrounded by at least one hard confectionery shell region comprising a hard boiled candy, and at least one soft panned coating surrounding the hard confectionery shell region; wherein the hard confectionery shell region and optionally the coating comprises at least one flavorant, the method comprising:
using the effervescent center-fill to enhance the release of flavorant from the hard confectionery shell region or from the hard confectionery shell region and the coating by accelerating the release rates of flavor compounds present in the hard confectionery shell region or in the hard confectionery shell region and the coating when the effervescent center-fill is exposed to solvent relative to release rates before effervescent center-fill exposure.

18. The method of claim 17,
wherein the hard confectionery shell region flavorant or the coating flavorant exhibits increased flavor release upon exposure of the effervescent center-fill to a solvent; and
wherein the flavor release is at least 225% greater than the baseline before effervescent center-fill exposure.

19. The method of claim 17,
wherein the hard confectionery shell region flavorant or the coating flavorant exhibits increased flavor release upon exposure of the effervescent center-fill to a solvent; and
wherein the flavor release rate ratio before and after effervescent center-fill exposure increases by at least 150% due to the effervescent center-fill composition for a flavorant contained in the coating or the hard confectionery shell region.

20. The method of claim 17,
wherein the hard confectionery shell region flavorant, the coating flavorant, or a combination thereof exhibits an increased flavor release rate, as measured in a solvent or a gas phase above the solvent, upon exposure of the effervescent center-fill during contact of the confectionery product with the solvent; and
wherein the flavor release rate is at least 225% greater after effervescent center-fill exposure than before effervescent center-fill exposure for a flavorant contained in the coating or hard confectionery shell region; or
wherein the flavor release rate ratio before and after effervescent center-fill exposure increases by at least 150% due to the effervescent center-fill composition for a flavorant contained in the coating or hard confectionery shell region.

* * * * *